United States Patent [19]
Nobusawa

[11] Patent Number: 5,193,211
[45] Date of Patent: Mar. 9, 1993

[54] POWER SAVING DC-DC CONVERTER FOR RADIO PAGERS

[75] Inventor: Hideaki Nobusawa, Tokyo, Japan
[73] Assignee: NEC Corporation, Tokyo, Japan
[21] Appl. No.: 737,546
[22] Filed: Jul. 30, 1991
[30] Foreign Application Priority Data
  Jul. 30, 1990 [JP] Japan .................. 2-201634
[51] Int. Cl.⁵ .................. H04Q 3/02; H04Q 7/14
[52] U.S. Cl. .................. 455/38.2; 455/38.3; 455/343; 323/222; 323/284
[58] Field of Search .......... 323/222, 282, 283, 284, 323/351; 455/38, 343, 38.2, 38.3

[56] References Cited

U.S. PATENT DOCUMENTS

| | | | |
|---|---|---|---|
| 4,634,956 | 1/1987 | Davis et al. | 323/283 |
| 4,755,816 | 7/1988 | DeLuca | 455/343 |
| 4,814,684 | 3/1989 | McCurdy | 323/222 |
| 4,955,075 | 9/1990 | Anderson | 455/343 |
| 5,028,861 | 7/1991 | Pace et al. | 323/222 |

FOREIGN PATENT DOCUMENTS 0129181 12/1984 European Pat. Off. .......... 323/222

Primary Examiner—Reinhard J. Eisenzopf
Assistant Examiner—Timothy H. Keough
Attorney, Agent, or Firm—Sughrue Mion Zinn Macpeak & Seas

[57] ABSTRACT

In a radio pager, the front end of the pager is powered by a battery. A decoder processes an incoming signal received by the front end and generates a first or a second signal when it is in an active state or an inactive state, respectively. A high duty-ratio pulse signal or a low duty-ratio pulse signal is generated in response to the first and second signals from the decoder, respectively. A voltage inducing circuit is connected across the terminals of the battery to respond to the high duty-ratio and low duty-ratio pulse signals by allowing a current to periodically pass through an inductor for a varying duration proportional to the duty ratio of either of the pulse signals to cause a voltage higher than the battery voltage to be induced in the inductor. A capacitor coupled to the inductor stores DC energy proportional to the duration of the current and supplies power to the decoder. A power savings circuit is provided for comparing the voltage developed in the capacitor with a reference voltage for ceasing the voltage in the capacitor to increase when it is higher than the reference voltage.

8 Claims, 1 Drawing Sheet

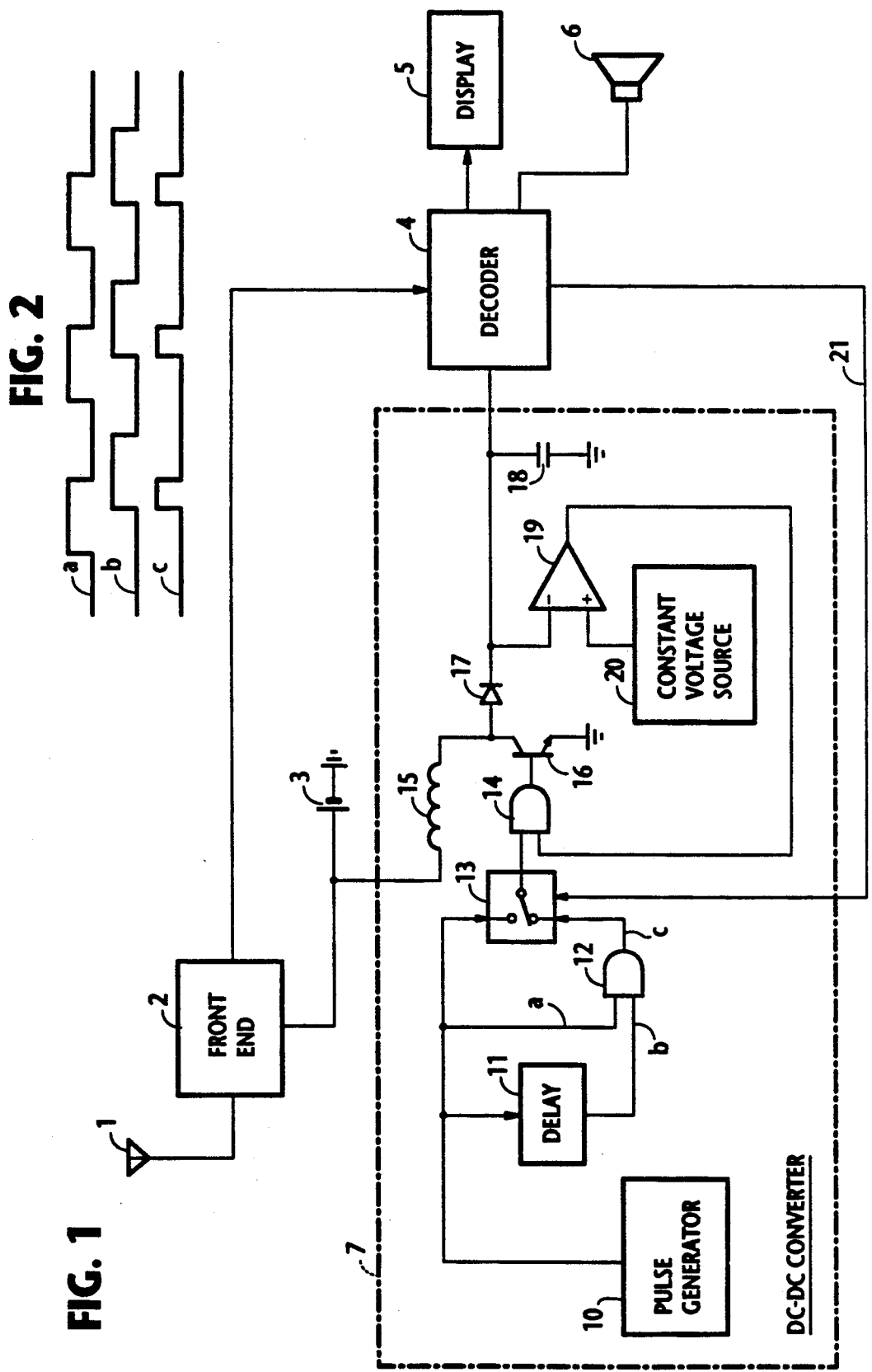

POWER SAVING DC-DC CONVERTER FOR RADIO PAGERS

BACKGROUND OF THE INVENTION

The present invention relates to a DC-DC converter for hand-held radio pagers.

Hand-held radio pagers are equipped with a built-in DC-DC converter for powering a decoder with a rated voltage. The DC-DC converter comprises a voltage inducing circuit coupled to a battery from which the front end of the pager receives its operating energy. The voltage inducing circuit is formed by a series of an inductor and a switching transistor which is turned on and off in response to gating pulses to charge a capacitor from which the decoder receives its operating energy. The gating pulse has a constant duty ratio that is predetermined so that the amount of DC energy stored in the capacitor meets the decoder's maximum energy requirement.

However, the inactive state of the decoder accounts for a greater period of the pager operation, and therefore, the prior art DC-DC converter for radio pagers wastes most of the limited amount of energy.

SUMMARY OF THE INVENTION

It is therefore an object of the present invention to provide a power saving DC-DC converter for radio pagers.

According to the present invention, there is provided a DC-DC converter for a radio pager having a front end and a decoder for processing an incoming signal received by the front end, wherein the front end is powered by a battery and the decoder generates a first signal indicating a first, or active state of the decoder and a second, or signal indicating a second, or inactive state of the decoder. A first pulse signal having a first duty ratio or a second pulse signal having a second duty ratio is generated in response to the first or second signals from the decoder, respectively. Connected across the battery is a voltage inducing circuit which includes an inductor and a gate-controlled switching element coupled thereto. The switching element is responsive to the first and second pulse signals for allowing a current to periodically pass through the inductor for a varying duration proportional to the duty of either of the pulse signals to cause a voltage higher than the voltage of the battery to be induced in the inductor. A capacitor is coupled to the inductor for storing DC energy proportional to the duration of the current and powering the decoder with a voltage developed therein. A power savings circuit is provided for comparing the voltage developed in the capacitor with a reference voltage. When the voltage in the capacitor is higher than the reference voltage, the capacitor voltage ceases to increase for power savings purposes.

BRIEF DESCRIPTION OF THE DRAWINGS

The present invention will be described in further detail with reference to the accompanying drawings, in which:

FIG. 1 is a circuit diagram of a radio display pager incorporating a DC-DC converter of the present invention; and FIG. 2 is a waveform diagram showing waveforms of the pulses generated in the circuit of FIG. 1.

DETAILED DESCRIPTION

In a radio display pager shown in FIG. 1, radio-frequency paging signals detected by antenna 1 are fed into a receiver, or front end 2 in which the signals are converted into a form that can be digitally processed and applied to a decoder 4 of known circuitry. In a known manner, decoder 4 drives a display 5 for providing a display of received information and a loudspeaker 6 for alerting the user.

Front end 2 is powered by a battery 3 and decoder 4, whose energy consumption varies significantly between active and inactive times, is powered by a DC-DC converter 7. DC-DC converter 7 is essentially a switching regulator and includes a pulse generator 10 that generates square-wave pulses "a" as shown in FIG. 2. This pulse signal is delayed by a predetermined amount by a delay circuit 11, producing a delayed pulse signal "b". These pulse signals are combined by an AND gate 12 to produce low duty-ratio pulses "c" in comparison with pulses "a". The high duty-ratio pulse signal from pulse generator 10 and the low duty-ratio pulse signal from AND gate 12 are supplied to the upper and lower positions of a switch 13, respectively, and one of the pulse signals is selectively applied to an AND gate 14 in accordance with the binary state of a load indicating signal which is supplied on lead 21 from decoder 4. The output of AND gate 14 is coupled to the base of a switching transistor 16 having an emitter-collector path connected between ground and one end of an inductor 15, the other end of which is coupled to battery 3. When AND gate 14 is enabled, switching transistor 16 is gated on and off according to the duty cycle of the pulses from AND gate 14 to induce a dumped oscillatory voltage higher than the voltage from battery 3. This voltage is rectified by a diode 17 and a capacitor 18, coupled to the cathode of diode 17, is charged to store DC energy of a varying level according to the load. As will be described, decoder 4 is sufficiently powered by this DC energy when processing the incoming signal and allows DC-DC converter 7 to decrease the amount of energy stored in capacitor 18 in the absence of incoming signals.

To the cathode of diode 17 is coupled the negative input of a comparator 19. The positive input of comparator 19 is connected to a constant voltage source 20. By comparator 19 the voltage developed across capacitor 18 is compared with a prescribed reference voltage set by constant voltage source 20. A logic-0 output is produced by comparator 19 when the capacitor voltage is higher than the reference voltage, otherwise a logic-1 output is produced. The output of comparator 19 is applied to AND gate 14. Therefore, AND gate 14 is enabled when the voltage developed in capacitor 18 is lower than the reference voltage to supply DC energy thereto, and is advantageously disabled for power savings purposes when it is higher than the reference voltage.

Decoder 4 generates a load indicating signal having a logic-1 state indicating that it is processing an incoming signal and a logic-0 state indicating that it is not processing signals. When the load-indicating signal is at logic-1 state, the contact of switch 13 is switched to the upper position for coupling the high duty-ratio pulse signal to AND gate 14. Otherwise, the switch is moved to the lower position for coupling the low duty-ratio pulse signal to AND gate 14.

Since the amount of energy stored in capacitor 18 is proportional to the amount of current flowing through transistor 16, the DC energy stored in capacitor 18 increases when transistor 16 is gated with the high duty-ratio pulses and decreases when it is gated with the low duty-ratio pulses. Therefore, the stored energy increases in the presence of an incoming signal and decreases in the absence of an incoming signal.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A DC-DC converter for a radio pager having a front end and a decoder for processing an incoming signal received by said front end, wherein the front end is powered by a battery and the decoder generates a first signal indicating a first operating state of the decoder and a second signal indicating a second operating state of the decoder, the DC-DC converter comprising:

variable duty pulse generator means for generating a first pulse signal of a first duty ratio in response to said first signal or a second pulse signal of a second duty ratio in response to said second signal;

a voltage inducing circuit connected to said battery for receiving a DC voltage therefrom, the circuit including an inductor and a gate-controlled switching element coupled thereto, the switching element being responsive to either of the first and second pulse signals generated by said variable duty pulse generator for allowing a current to periodically pass through the inductor for a varying duration proportional to the duty of either of said pulse signals and inducing in said inductor a voltage higher than the DC voltage of said battery;

a capacitor coupled to the inductor for storing DC energy proportional to the duration of said current and powering the decoder with a voltage developed therein; and power savings means for comparing the voltage developed in the capacitor with a reference voltage and preventing the voltage in said capacitor from increasing when the voltage developed in the capacitor is higher than the reference voltage.

2. A DC-DC converter as claimed in claim 1, wherein the first-ratio pulse signal and the second pulse signal are of the same pulse repetition rate.

3. A DC-DC converter as claimed in claim 2, wherein said first and second signals respectively indicate an active state of the decoder and an inactive state of the decoder, and wherein said variable duty pulse generator means comprises:

a pulse generator for generating a high duty-ratio pulse signal as said first pulse signal;

delay means for delaying the high duty-ratio pulse signal; and gate means for combining the high duty-ratio pulse signal from the pulse generator and the delayed pulse signal to produce a low duty-ratio pulse signal as said second pulse signal.

4. A DC-DC converter as claimed in claim 1, wherein the power savings means comprises:

gate means coupled between the variable duty pulse generator means and the switching element of the voltage inducing circuit; and a comparator for comparing the voltage developed in said capacitor with the reference voltage and causing the gate means to apply either of said high duty-ratio and low duty-ratio pulse signals to the switching element when the developed voltage is lower than the reference voltage and causing the gate means to cease to apply said pulse signals to the switching element when the developed voltage is higher than the reference voltage.

5. A radio receiver having a front end which is powered by a battery, comprising:

a decoder for processing an incoming signal received by said front end and generating a first signal indicating a first operating state of the decoder and a second signal indicating a second operating state of the decoder;

variable duty pulse generator means for generating a first pulse signal of a first duty ratio in response to said first signal or a second pulse signal of a second duty ratio in response to said second signal;

a voltage inducing circuit connected to said battery for receiving a DC voltage therefrom, the circuit including an inductor and a gate-controlled switching element coupled thereto, the switching element being responsive to either of the first and second pulse signals generated by said variable duty pulse generator for allowing a current to periodically pass through the inductor for a time duration proportional to the duty of either of said pulse signals and inducing in said inductor a voltage higher than the DC voltage of said battery;

a capacitor coupled to the inductor for storing DC energy proportional to the duration of said current and powering the decoder with a voltage developed therein; and power savings means for comparing the voltage developed in the capacitor with a reference voltage and preventing the voltage in said capacitor from increasing when the voltage developed in the capacitor is higher than the reference voltage.

6. A radio receiver as claimed in claim 5, wherein the first-ratio pulse signal and the second pulse signal are of the same pulse repetition rate.

7. A radio receiver as claimed in claim 6, wherein said first and second signals respectively indicate an active state of the decoder and an inactive state of the decoder, and wherein said variable duty pulse generator means comprises:

a pulse generator for generating a high duty-ratio pulse signal as said first pulse signal;

delay means for delaying the high duty-ratio pulse signal; and gate means for combining the high duty-ratio pulse signal from the pulse generator and the delayed pulse signal to produce a low duty-ratio pulse signal as said second pulse signal.

8. A radio receiver as claimed in claim 5, wherein the power savings means comprises:

gate means coupled between the variable duty pulse generator means and the switching element of the voltage inducing circuit; and a comparator for comparing the voltage developed in said capacitor with the reference voltage and causing the gate means to apply either of said high duty-ratio and low duty-ratio pulse signals to the switching element when the developed voltage is lower than the reference voltage and causing the gate means to cease to apply said pulse signals to the switching element when the developed voltage is higher than the reference voltage.

* * * * *